(12) United States Patent
Torres et al.

(10) Patent No.: US 9,809,174 B1
(45) Date of Patent: Nov. 7, 2017

(54) FURNITURE WITH INCORPORATED ENTERTAINMENT AND REVENUE SYSTEM

(71) Applicants: Adrian Torres, Miami, FL (US); Nancy O Torres, Miami, FL (US)

(72) Inventors: Adrian Torres, Miami, FL (US); Nancy O Torres, Miami, FL (US)

( * ) Notice: Subject to any disclaimer, the term of this patent is extended or adjusted under 35 U.S.C. 154(b) by 0 days.

(21) Appl. No.: 14/557,899

(22) Filed: Dec. 2, 2014

Related U.S. Application Data (60) Provisional application No. 61/913,705, filed on Dec. 9, 2013.

(51) Int. Cl.
| | | |
|---|---|---|
| *B60N 2/14* | (2006.01) | |
| *B60R 11/02* | (2006.01) | |
| *A47C 1/04* | (2006.01) | |
| *B60N 2/00* | (2006.01) | |
| *B60N 2/48* | (2006.01) | |
| *B60R 11/00* | (2006.01) | |
| *A61G 15/08* | (2006.01) | |
| *A47C 1/126* | (2006.01) | |
| *A47C 7/72* | (2006.01) | |

(52) U.S. Cl.
CPC ............ *B60R 11/0235* (2013.01); *A47C 1/04* (2013.01); *A47C 1/126* (2013.01); *A47C 7/72* (2013.01); *A61G 15/08* (2013.01); *B60N 2/002* (2013.01); *B60N 2/14* (2013.01); *B60N 2/4876* (2013.01); *B60R 2011/0017* (2013.01)

(58) Field of Classification Search
CPC ........ B60R 11/0235; B60R 2011/0017; B60N 2/4876; B60N 2/002; B60N 2/14; A47C 7/72; A47C 1/04; A47C 1/126; A61G 15/08
USPC ... 297/217.7, 217.3, 188.08, 188.12, 188.13, 297/240; 279/148 R, 148 B, 143 R; 248/276.1; 273/148 R, 148 B, 143 R
See application file for complete search history.

(56) References Cited

U.S. PATENT DOCUMENTS

| | | | | |
|---|---|---|---|---|
| 8,403,411 | B2 * | 3/2013 | Boyer, Jr. .............. | B64D 11/06 297/217.3 |
| 2003/0057749 | A1 * | 3/2003 | Buono ..................... | B60N 2/44 297/217.3 |
| 2008/0246320 | A1 * | 10/2008 | Chang ................. | B60R 11/0235 297/217.3 |

\* cited by examiner

*Primary Examiner* — Syed A Islam
(74) *Attorney, Agent, or Firm* — Ruben Alcoba, Esq.

(57) ABSTRACT

An entertainment system that is used in a barbershop or a beauty shop that includes a chair having a seat, the chair defines a cavity, at least one display device, a movable member attached to the seat portion and to the display device, the display device is housed within the cavity when the movable member is in a retracted position, and at least one audio output. The display device can be either a computer, a tablet, a smart phone, a game console, or an electronic gaming device.

8 Claims, 8 Drawing Sheets

FURNITURE WITH INCORPORATED ENTERTAINMENT AND REVENUE SYSTEM

CROSS REFERENCES

This application claims the benefit of U.S. provisional Application No. 61/913,705, filed Dec. 9, 2013. The entire disclosures of the application is relied on and incorporated into this application by reference.

BACKGROUND

The present invention is directed to a barber or beauty shop chair that houses a retractable entertainment device.

The chair is designed to allow a customer that is at a barber or at a beauty shop to be entertained while enjoying a haircut or receiving any other type of grooming service.

Chairs have been made that house entertainment systems, e.g. U.S. Pat. No. 8,534,753, issued to Perez discloses an Entertainment Chair System that features a first half platform and a second half platform mounted atop a base, the first half platform can be reclined or elevated. An inner storage compartment is disposed in the base, wherein a door disposed in the base allows and prevents access to the inner compartment of the base. A television with a mounting system is pivotally attached to the first half platform. The mounting system functions to position the television parallel to the first half platform. A dispensing system is disposed below the base. The system is not a barber or beauty shop chair that is used to entertain a customer receiving a haircut or a grooming service.

U.S. Pat. No. 6,092,868, issued to Wynn discloses a Computer Work Station that includes a reclining chair has a back rest, a seat, a leg rest, and a pair of arm rests. The reclining chair has a support base for supporting the reclining chair above a surface. A computer is mounted to the reclining chair. A pair of key pads electrically connected to the computer for inputting data into the computer are provided. Each of the arm rests has a key pad swivelably attached thereto. A monitor is pivotally connected to the back rest and is electrically connected to the computer for displaying visual images from the computer. The system is not a barber or beauty shop chair that is used to entertain a customer receiving a haircut or a grooming service.

U.S. Pat. No. 8,267,472, issued to Large, et al. discloses a Seat provided with a pivoting display screen that comprises at least one armrest and a foldaway display screen. The screen comprises an articulated supporting arm mounted on a movable carriage and the armrest comprises a circularly arcuate rail, the top end of the rail being substantially vertical and the bottom portion substantially horizontal, the carriage being secured to said rail and being able to move in translation between a first bottom position for stowage of the screen and a second top position of the screen. The screen may also comprise a cover so that it can be used as a tray. The system is not a barber or beauty shop chair that is used to entertain a customer receiving a haircut or a grooming service.

For the foregoing reasons, there is a need for a barber shop or beauty shop chair that houses an entertainment device. The entertainment device is housed under the seat of the chair and extends outwardly when the device is used.

SUMMARY OF THE INVENTION

In one embodiment, the present invention relates to a specific new type of Barber Chair/Beauty Parlor Chair/Pedicure Chair that takes into consideration the entertainment of the client during the time that the service is performed.

This particular Barber Chair/Beauty Parlor Chair/Pedicure Chair has a build-in mechanism that when activated enables the use of a tablet, T.V. receiver, video screen monitor, or combinations thereof with optional Internet access, to use for the entertainment of the client during the time the service is conducted.

The process of hair cutting, styling, curling, coloring and pedicure takes time to perform and sometimes a client could be sitting on a chair for prolonged periods. The present invention provides a system whereby a client can selectively be reading his or hers e-mails, playing a video game (the System will also has the ability to connect a video game system such as PlayStation® or Xbox®) watching a movie or video, downloading music on his own particular screen that will also have the audio capability with earphones to use for privacy, or combinations thereof.

This particular chair is an improvement over past systems in that it incorporates the unique capability having the "arm like" built in mechanism that could be activated for use at the moment the client choose to use it for the various forms of entertainment.

In one embodiment, a credit card or payment actuator will be located at the establishment with a pre-set amount chosen by the client to cover an hour, two hours, etc. as the client chooses.

This particular model will be credit card activated. We are calling this Model #1. The details of prices for time of use will be chosen by the owner and/or operator of the chair.

There will also be a similar capability Chair Model #2 but easily activated with just an on/off switch for those store owners that may want to offer the extra luxury to their clients on a possible spa-like salon as a plus, and also for residential use, for those that may want their own chair at home. It is contemplated that Model #2 will come with (4) speakers built in so it could be used as a sound system while the service is provider or with the option of earphones for private entertainment.

Other aspect or application of this Invention is to provide the add-on attachment mechanism that may be easily adapted to many Barber/Beautician/Pedicure Chairs to provide a more economic option to those business owners that already have the regular chairs on their premises and will want to consider to do the adaptation to their own equipment and offer a plus to their clients.

Other aspect of this Invention is that the add-on mechanism could also be use on other Chairs such as a Recline and/or Massage Chair to be able to relax and enjoy the entertainment provider by the easy access to the source such as tablet computer, T.V., or monitor to enjoy music, videos, movies, Video Games playing and Internet access.

This Invention with the general capabilities already explained will be of great use and value for children entertainment during the process of hair cutting due to the fact that is really hard to keep a child calm and quiet while the professional is trying to do his/her work. Children will love to get a haircut at the new establishment that offers such a plus for entertainment during that time.

The aforementioned Recline/Massage Chairs could be also a good source of income on Malls and different establishment such as Coffee Lounges, Reading Rooms, libraries, airports, etc., with the add-on equipment install or with Chairs manufacture with our Invention integrated by special orders.

We are living at a fast-paced digital world where every minute counts, and the options to access the different modes of our Invention give us the opportunity of "multi-tasking" during the necessary process of hair cutting, curling, tinting, or any time that requires a patron to wait, etc., and the children entertainment possibility will be of great value for parents and professionals. The very first Hair Cut for a child won't be a scary event anymore.

An object of the present invention is to provide a patron of a barber shop or a beauty shop an entertainment device that they can use while being groomed. While sitting on a barber shop chair, beauty shop chair, or a hair dryer chair.

As per our drawings we have different options for the creation of the Invention and all of them should be consider for the purpose of this Application, and also the add-on capability already explained that will open extra options to apply the core of the Invention.

BRIEF DESCRIPTION OF THE SEVERAL VIEWS OF THE DRAWINGS

These and other features, aspects, and advantages of the present invention will become better understood with regard to the following description, appended claims, and drawings where:

DETAILED DESCRIPTION OF THE PREFERRED EMBODIMENT

Figure 1:
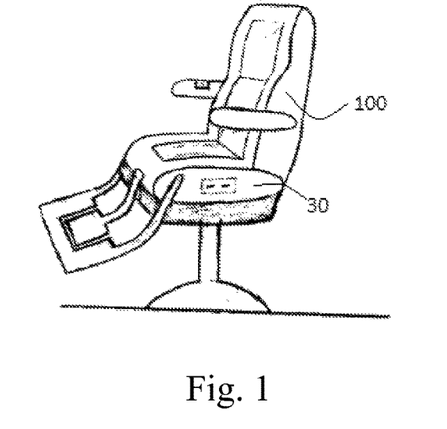
FIG. 1 is a perspective view of one embodiment of the present invention having a retractable monitor incorporated into a foot rest area whereby the monitor is mounted on the front of the chair portion.
Figure 2:
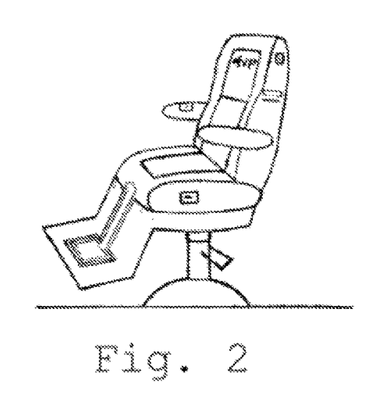
FIG. 2 is a perspective view of the present invention having a retractable monitor incorporated into a foot rest area.
Figure 3:
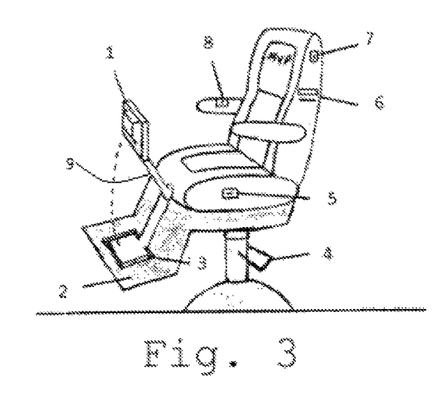
FIG. 3 is a perspective view of the present invention whereby a video monitor is shown in position for viewing by a person sitting in a chair of the present invention.
Figure 4:
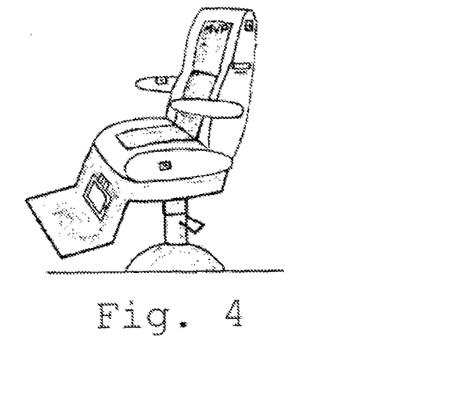
FIG. 4 is a perspective view of an embodiment of the present invention whereby the video monitor is mounted on the footrest.
Figure 5:
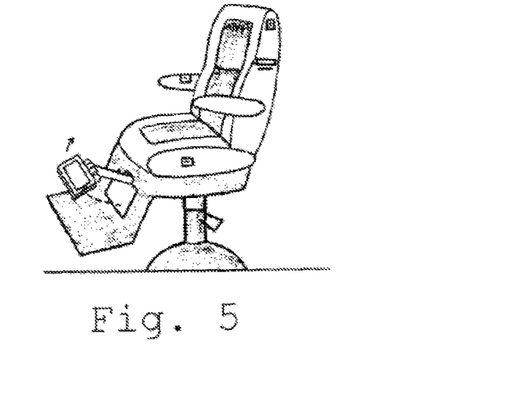
FIG. 5 is a progressive view from FIG. 4 demonstrating removal of the monitor from a retracted position.
Figure 6:
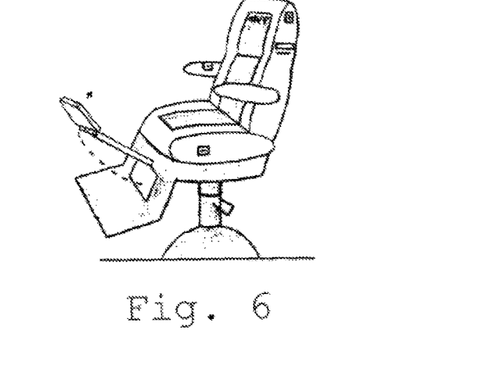
FIG. 6 is a progressive view from FIG. 5 demonstrating continual movement of the monitor from the retracted position towards a viewing position.
Figure 7:
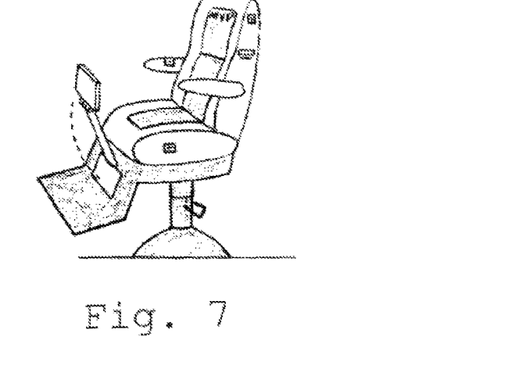
FIG. 7 is a progressive view from FIG. 6 demonstrating the monitor in a viewing position.
Figure 8:
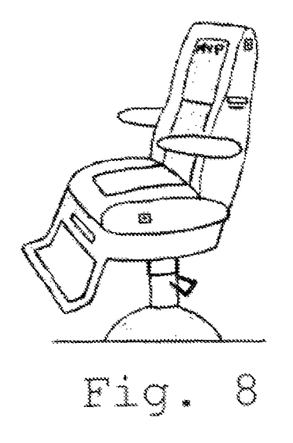
FIG. 8 is an embodiment of the present invention whereby the monitor is retracted into a cavity underneath the chair.
Figure 9:
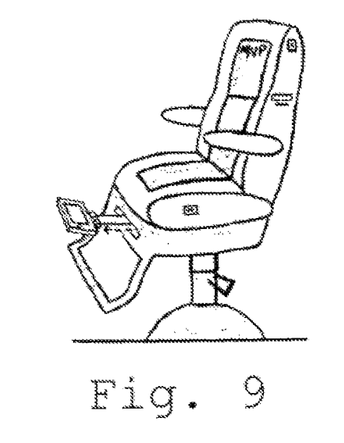
FIG. 9 is a progressive view from FIG. 8 demonstrating removal of the monitor from its retracted position.
Figure 10:
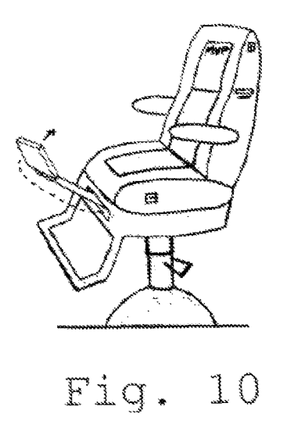
FIG. 10 is a progressive view from FIG. 9 demonstrating movement of the monitor into position for use.
Figure 11:
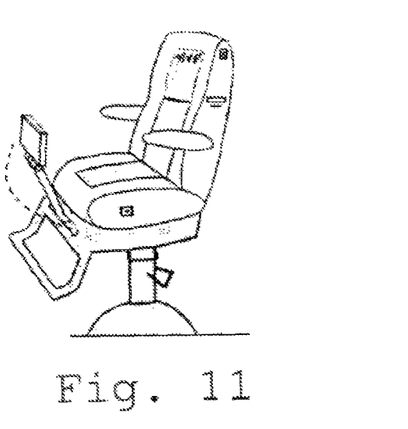
FIG. 11 is a progressive view from FIG. 10 demonstrating positioning of the monitor for use when a person is sitting in the chair.
Figure 12:
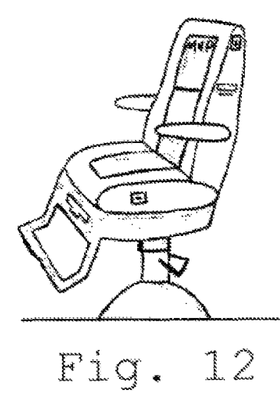
FIG. 12 is an embodiment of the present invention whereby the monitor is retracted into a cavity underneath the chair.
Figure 13:
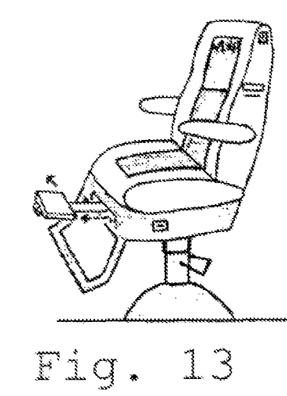
FIG. 13 is a progressive view from FIG. 8 demonstrating removal of the monitor from its retracted position.
Figure 14:
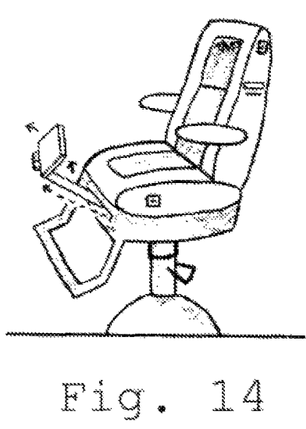
FIG. 14 is a progressive view from FIG. 9 demonstrating movement of the monitor into position for use.
Figure 15:
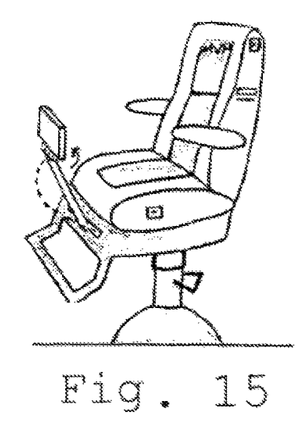
FIG. 15 is a progressive view from FIG. 10 demonstrating positioning of the monitor for use when a person is sitting in the chair.
Figure 16:
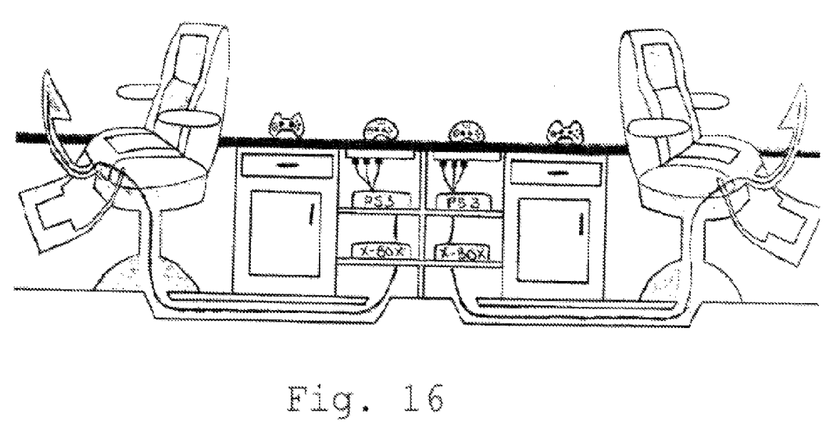
FIG. 16 is demonstrative of one embodiment of the present invention whereby at least two chairs are connected to an entertainment system whereby the entertainment is selectively delivered to the chairs.

In one embodiment, as demonstrated in FIG. 3 a display device 1 attached to a movable member 9 in the front of a chair 100 with a retraction cavity 3 incorporated into footrest 2. The chair defines a seat 30. The chair has standard foot operated pump 4 to raise and lower the chair. Although each of the following elements are demonstrated in the figure, in an embodiment of the invention is constantly updated to include any one or combination of: electrical switch 5 to raise and lower monitor 1; magnetic card reader 6, configured to accept payment and initiates components of the system; back rest switch 7 for movement of the back portion of the chair; audio input jack 8. The display device 1 can be either a computer, a table, a smart phone, a game console, or an electronic gaming device.

Figure 17:
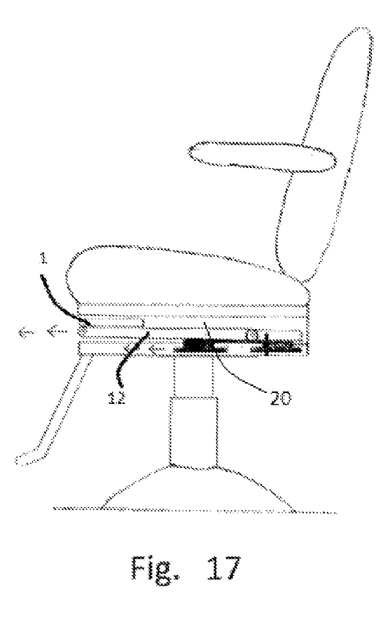
FIG. 17 is a side view of one embodiment of the invention wherein the entertainment device is retracted underneath the seat of a barber chair.
Figure 18:
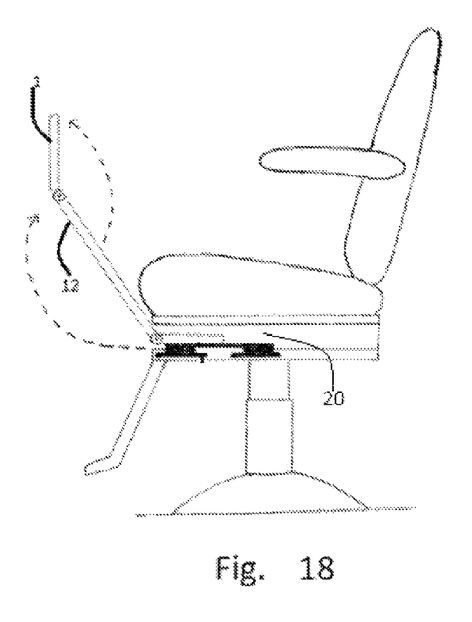
FIG. 18 is a side view of one embodiment of the invention wherein the entertainment device is in the extracted position.
Figure 19:
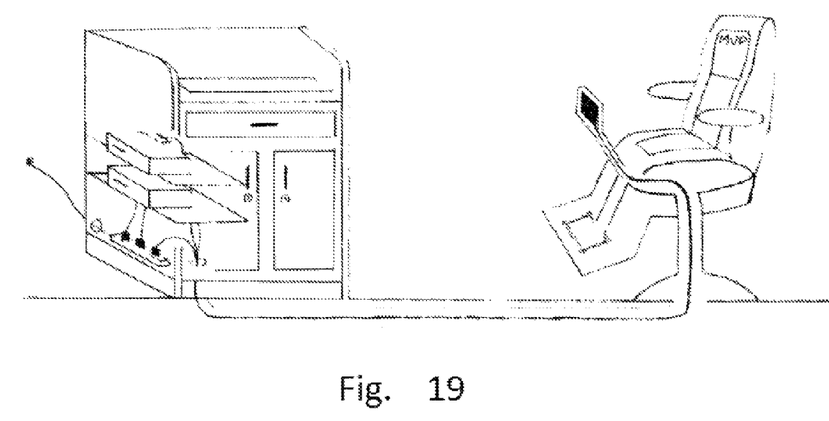
FIG. 19 is a side view of another embodiment of the present invention showing a complete system.
Figure 20:
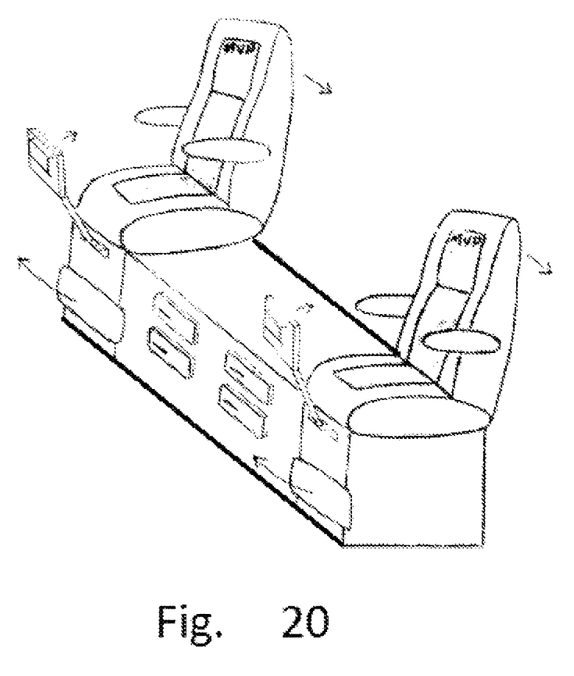
FIG. 20 is a perspective view of another embodiment of the present invention.

In another embodiment of the present invention, as seen in FIGS. 17 and 18, the movable member 12 that attaches to the display device 1 is housed within a retraction cavity 20 that is positioned directly under the seat of the chair 100. The reason that the movable member 12 is positioned underneath the seat of the chair is to minimize the possibility of the monitor being accidently damaged when not in use.

In one embodiment of the present invention, it is contemplated that appropriate electronics and computer readable medium or incorporated into the system of the present invention whereby an owner or operator is able to monetize the use of the system of the present invention by a patron. The monetization includes the rental or sale of earphones, providing an access card having a predetermined amount of access time, or providing access to the system using a credit card.

In another body to the present invention, the system of the present invention can be used for residential use incorporating any one of speakers, audio output, and other elements desirable in a home use system.

As discussed above, in one embodiment, the system of the present invention is incorporated into a chair utilized by a patron involved in an activity that requires waiting. Although many of the examples relate to a person receiving a haircut, manicure, pedicure, or other personal care service, it is contemplated that the present invention be suitable and utilized in any activity whereby a patron is required to sit and wait for a particular service to complete.

The system includes a monitor that can be any one or combination of, a TV monitor, Internet monitor, game console, and the like. Additionally, the owner and/or operator of the system of the present invention can provide particular entertainment systems such as the well-known PlayStation, Xbox, and the like.

The various configurations described in the figures are demonstrative of various embodiments of the present invention and each provide the general system whereby a display device is moved into a position of use and subsequently retracted when the system is no longer needed or desired.

An advantage of the present invention is that it provides a patron of a barber shop or a beauty shop an entertainment device that they can use while being groomed.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. An entertainment system that is used in a barbershop or a beauty shop, the system comprises:
    a chair having a seat, the chair has a front, area; a top and a bottom
    a footrest attaches to the chair at the chair's bottom and front side, the footrest defines a cavity;
    a moveable member that has a seat attachment side and a display device attachment side, the seat attachment side of the member attaches to front seat portion of the chair;
    a display device that attaches to the display attachment side of the moveable member, the display device is housed within the cavity of the footrest when not in use;
    at least one audio output; and
    an actuator for initiating the system.

2. The system of claim 1, wherein the actuator includes a magnetic card reader.

3. The system of claim 2, wherein the magnetic card reader is constructed an arranged to receive payment from either a credit card or prepaid card.

4. The system of claim 3, wherein said display device is either a computer, a table, a smart phone, a game console, or an electronic gaming device.

5. The system of claim 1, wherein the front seat portion of the chair defines a retraction cavity and wherein the movable member and the display device are housed within the retraction cavity.

6. The system of claim 5, wherein the actuator includes a magnetic card reader.

7. The system of claim 6, wherein the magnetic card reader is constructed an arranged to receive payment from either a credit card or prepaid card.

8. The system of claim 7, wherein said display device is either a computer, a table, a smart phone, a game console, or an electronic gaming device.

* * * * *